G. RESTUCCI.
TIRE FOR WHEELS.
APPLICATION FILED JULY 28, 1916.
1,241,283.
Patented Sept. 25, 1917.
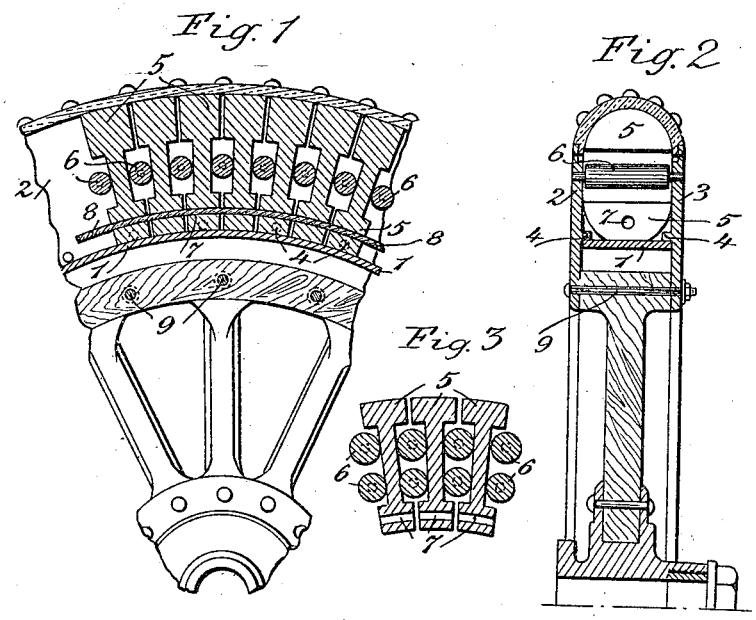

UNITED STATES PATENT OFFICE.

GIUSEPPE RESTUCCI, OF NAPLES, ITALY, ASSIGNOR TO THE FIRM; RESTUCCI, MUSSO & CO., OF NAPLES, ITALY.

TIRE FOR WHEELS.

1,241,283.  Specification of Letters Patent.  Patented Sept. 25, 1917.

Application filed July 28, 1916. Serial No. 111,810.

*To all whom it may concern:*

Be it known that I, GIUSEPPE RESTUCCI, a subject of the King of Italy, residing at Naples, Italy, (whose post-office address is Nuovo Corso Garibaldi No. 156,) have invented a new and useful Improvement in or Relating to Tires for Wheels, of which the following is a specification.

The subject of the present invention is an elastic mechanical tire for vehicle wheels in general.

The invention is represented by way of example in two constructional forms in the annexed drawing.

Figure 1 shows a specimen of tire, seen from the side, partly in section, applied to an automobile wheel.

Fig. 2 is the section thereof taken in a radial direction.

Fig. 3 shows a modification of the construction shown in Figs. 1 and 2.

In the said figures the principal elastic member consists of a ring-shaped spring 1 placed concentrically to the rim or felly, from which it is separated by a space allowing it a certain amount of play inward. Outward the spring is limited in its movements by projections 4 cast on or secured to the annular side plates forming the sides (walls) 2 and 3.

On the circumference of the said annular spring 1, blocks 5 press, which are shaped almost like double T's, between the shanks (stems) of which small rollers 6 are located which serve to diminish the friction, and the pivots of which are supported by the side plates 2 and 3. The object of the said rollers is to facilitate the return of the blocks to their position after each deformation of the spring 1 caused by the weight of the vehicle.

To keep the said blocks assembled and constantly in contact with the periphery of the annular spring 1 the blocks are connected together by one or several metallic wires 8 passing through holes 7 in the inner portion (Figs. 1, 2 and 3). To the outer end of the said blocks, which form the tread, is applied a leather or rubber covering provided with nails, which form the non-skid. Ordinary bolts 9 fix the annular side plates 2 and 3 to the rim or felly of the wheel. The above-mentioned antifriction rollers 6 placed between the blocks may be duplicated as in Fig. 3, and the blocks may be preferably in aluminium or any other light metal. They may also be made of fibrous materials, of hard wood, etc.

Elasticity is given to the tire by the spring 1, which under the pressure of the weight of the vehicle, and therefore under that of the blocks which press on its circumference, and as it is restrained from outward movement owing to the projections 4 it is temporarily deformed, and immediately reacts in such a way that the whole of the periphery is rendered elastic. This deformation, being momentary, disappears immediately through further rolling.

Having now particularly described and ascertained the nature of the said invention and in what manner the same is to be performed, I declare that what I claim is:—

1. An elastic tire for wheels, comprising side plates adapted to be secured to the rim of the wheel and having projections on their inner faces, a spring band between the side plates and engaging the projections thereof, a plurality of blocks of double T-form connected together, said blocks being of a width approximately equal to the distance between the side plates and resting on the band, and rollers arranged between the said blocks.

2. An elastic tire, comprising side plates adapted to be secured to the rim of the wheel and having projections on their inner faces, a spring band between the side plates and engaging the projections thereof, a plurality of blocks of a width approximately equal to the distance between the side plates and resting upon the band and having recesses in their sides intermediate of their ends, rollers mounted in the side plates and extending between the blocks in the said recesses, means for connecting the blocks together, and a covering secured to the outer faces of the blocks.

In testimony whereof I have signed my name to this specification.

GIUSEPPE RESTUCCI.

Copies of this patent may be obtained for five cents each, by addressing the "Commissioner of Patents, Washington, D. C."